United States Patent
Chater et al.

(10) Patent No.: US 7,170,528 B1
(45) Date of Patent: Jan. 30, 2007

(54) FAST GLYPH RENDERING FOR VECTOR BASED FONTS

(75) Inventors: Paul Chater, London (GB); Karin Smith, Phoenixville, PA (US); George Smith, Phoenixville, PA (US)

(73) Assignee: Bentley Systems, Inc., Exton, PA (US)

( * ) Notice: Subject to any disclaimer, the term of this patent is extended or adjusted under 35 U.S.C. 154(b) by 700 days.

(21) Appl. No.: 10/278,028

(22) Filed: Oct. 23, 2002

(51) Int. Cl.
*G09G 5/00* (2006.01)

(52) U.S. Cl. .................. 345/587; 345/467; 345/468; 345/472; 345/472.1; 345/472.2

(58) Field of Classification Search .............. 345/587, 345/592, 467, 468, 472, 472.1, 472.2
See application file for complete search history.

(56) References Cited

U.S. PATENT DOCUMENTS 6,292,192 B1 * 9/2001 Moreton ............... 345/586

* cited by examiner

*Primary Examiner*—Kee M. Tung
*Assistant Examiner*—Tam Tran
(74) *Attorney, Agent, or Firm*—Venable LLP; Caroline J. Swindell

(57) ABSTRACT

A method of rendering a glyph of a vector-based font comprises the steps of: generating a MIP map for a glyph, where the MIP map comprises at least one level having a plurality of pixels and where each level is generated from original vector data for the glyph; and storing the MIP map on a computer readable medium. The method further comprises placing the glyph in an image to be rendered; retrieving the stored MIP map for the glyph; rendering a level of the MIP map, where the level is associated with a resolution of the glyph; and displaying the glyph as the rendered level.

13 Claims, 5 Drawing Sheets

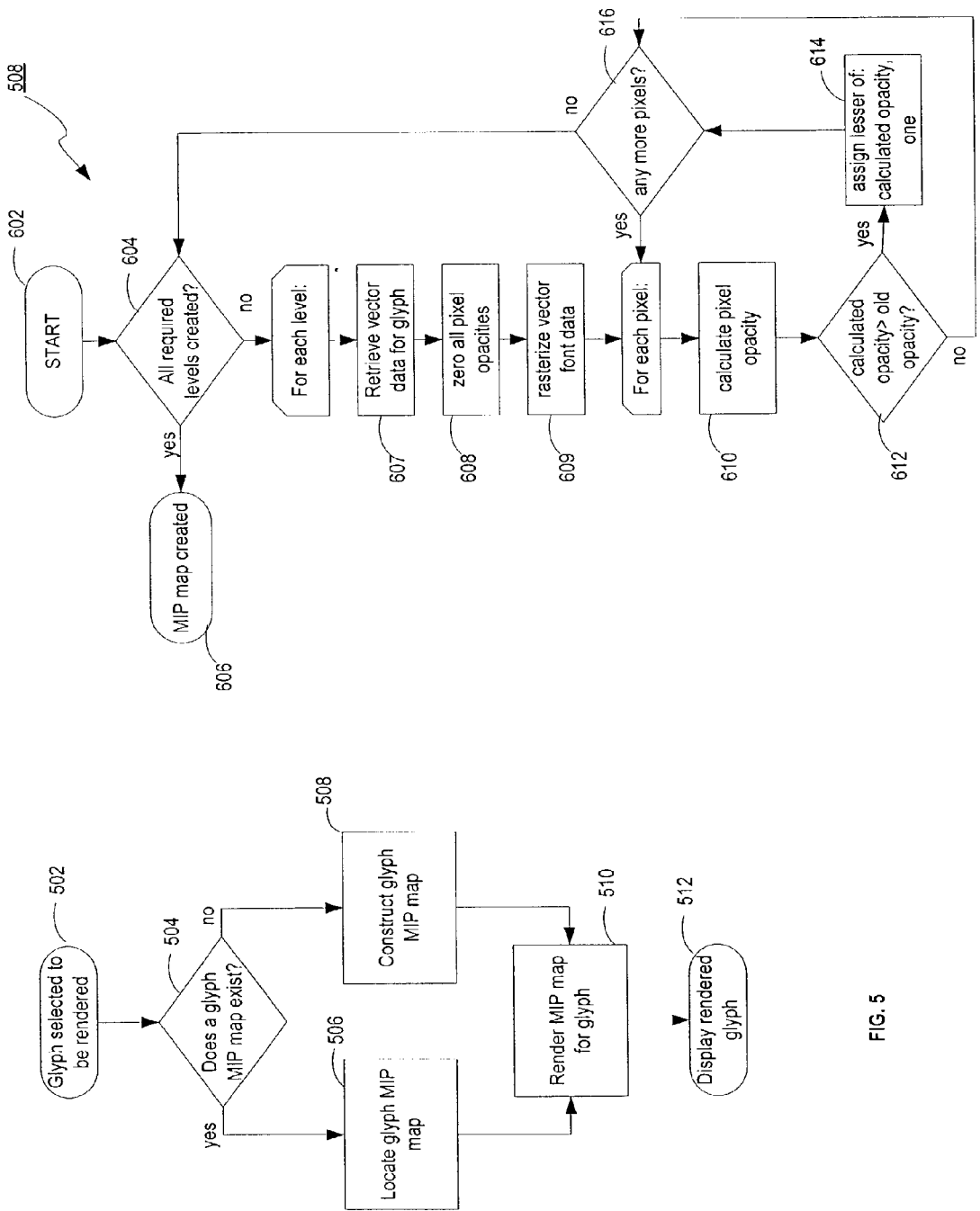

FAST GLYPH RENDERING FOR VECTOR BASED FONTS

BACKGROUND OF THE INVENTION

1. Field of the Invention

The present invention relates generally to computer assisted design (CAD) rendering, and more particularly to rendering vector-based fonts.

2. Related Art

Computer assisted design (CAD) systems construct, or render, two dimensional representations of three dimensional scenes. A user viewing the rendering can often rotate the image to view it from different vantage points, and zoom in or out to different resolutions to see all of the scene in less detail or a small part of the scene in great detail.

Some CAD systems represent the objects in a scene as vectors. A vector refers to a representation of graphical data, including CAD data, in which the elements in a graphical image are represented as lines and/or shapes, as opposed to raster data in which an image is represented as a collection of points or pixels.

Text in a CAD scene is also an object, and can be represented as a vector. The text in a CAD scene is often required to be viewed at different resolutions and orientations. Traditionally, text represented using vector based fonts has been rendered using standard line drawing algorithms. However, when these line drawing algorithms are used, scenes containing large amounts of text are rendered very slowly. This wastes the user's time, who must wait for the scene to finish rendering before continuing to work with the scene.

One solution to the rendering problems of speed and readability of text in a CAD drawing is to use a MIP map. A MIP map is an array of bitmap images used as surface textures when rendering a two dimensional representation of a three dimensional scene.

Each of the images stored in the MIP map holds a copy of the same texture but at a different scale from the other images. Each image at a given scale is a MIP map level. The largest-scale copy of the texture is used on surfaces close to the observer's viewpoint; while the smallest-scale image is used on the farthest surfaces. The MIP map levels normally differ from each other by powers of two. For example, the largest scale MIP map might have a resolution of 64×64 pixels, the next level at 32×32, then 16×16, 8×8 and so on.

An advantage of using MIP maps is that the pre-scaled versions of a single texture save the processing time that would be required to scale-down a large texture to make it usable on a "distant" surface. Scaling of textures is often still necessary, but by selecting the version of the texture which is closest to the required scale, the scaling process takes less time and reduces the possibility of errors, and the consequent distortion, introduced by the scaling process.

MIP maps are traditionally constructed by starting with the largest scale image, and averaging adjacent pixels in the image to get a color and brightness value for a pixel in the next smaller scale image. This next smaller scale image is then used to repeat the process to obtain a still smaller scale image. This approach does not work well with text represented by vector-based fonts, however. Text is usually made up of thin line segments, which quickly average into the background when this iterative approach is used. Thus, text becomes essentially invisible at the small scales of larger "distances" from the viewer's perspective. This is a problem especially with "stick" fonts, which have no filled regions in the glyphs and do not get wider when zoomed in on. A glyph is a graphical representation of a character in a font.

FIG. 1 depicts an embodiment of a text rendering according to conventional rendering techniques. Specifically, FIG. 1 shows six lines of text, at progressively smaller resolutions that are not anti-aliased. The lines in the glyphs that make up the text are jagged, not smooth, making some glyphs more difficult to read against the background. The glyphs rendered in this way also take a comparatively long time to render.

What is needed then is an improved method of rendering vector based fonts that overcomes shortcomings of conventional solutions.

SUMMARY OF THE INVENTION

In an exemplary embodiment of the present invention a system, method and computer program product for fast glyph rendering of vector based fonts are disclosed.

In an exemplary embodiment, the present invention can be a method of rendering a glyph of a vector-based font comprising the steps of: generating a MIP map for a glyph, where the MIP map comprises at least one level having a plurality of pixels and where each level is generated from original vector data for the glyph; and storing the MIP map on a computer readable medium.

In another exemplary embodiment, the present invention can be a method for generating a MIP map, comprising the steps of: obtaining vector data for a glyph; determining a pixel opacity for each pixel in a first selected level of the MIP map with a first function based on the vector data; and determining a pixel opacity for each pixel in a different selected level of the MIP map with a different function based on the vector data.

In another exemplary embodiment, the present invention can be a method of rendering a glyph of a vector-based font comprising the steps of: generating a MIP map for a glyph, where the MIP map comprises at least one level having a plurality of pixels and where a pixel opacity at each level of the MIP map is calculated from a different opacity function; and storing the MIP map on a computer readable medium.

In another exemplary embodiment, the present invention can be a method for generating a MIP map of a glyph of a vector-based font, the MIP map comprising at least one level and a plurality of pixels, the method comprising the steps of: for each level of the MIP map, determining a distance from each pixel in the level to the glyph using the vectors that construct the glyph; calculating a pixel coverage and a pixel opacity based on a function of the distance.

In another exemplary embodiment, the present invention can be a system for rendering a glyph of a vector-based font comprising: means for generating a MIP map for a glyph, where the MIP map comprises at least one level having a plurality of pixels and where each level of the MIP map is generated from original vector data for the glyph; and means for storing the MIP map on a computer readable medium.

In another exemplary embodiment, the present invention can be a system for generating a MIP map having at least one level and a plurality of pixels, the system comprising: means for obtaining vector data for a glyph; first means for determining a pixel opacity for each pixel in a first selected level of the MIP map based on the vector data; and second means for determining a pixel opacity for each pixel in a different selected level of the MIP map based on the vector data.

In another exemplary embodiment, the present invention can be a computer useable information storage medium storing computer readable program code for causing a computer to perform the steps of: generating a MIP map for a glyph, where the MIP map comprises at least one level having a plurality of pixels and where each level of the MIP map is generated from original vector data for the glyph; storing the MIP map on a computer readable medium; retrieving the stored MIP map for the glyph; rendering a level of the MIP map, where the level is associated with a resolution of the glyph; and displaying the glyph as the rendered level.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

FIG. 5 depicts an exemplary embodiment of the method of the present invention; and FIG. 6 depicts an exemplary embodiment of the method of constructing a MIP map according to the present invention.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
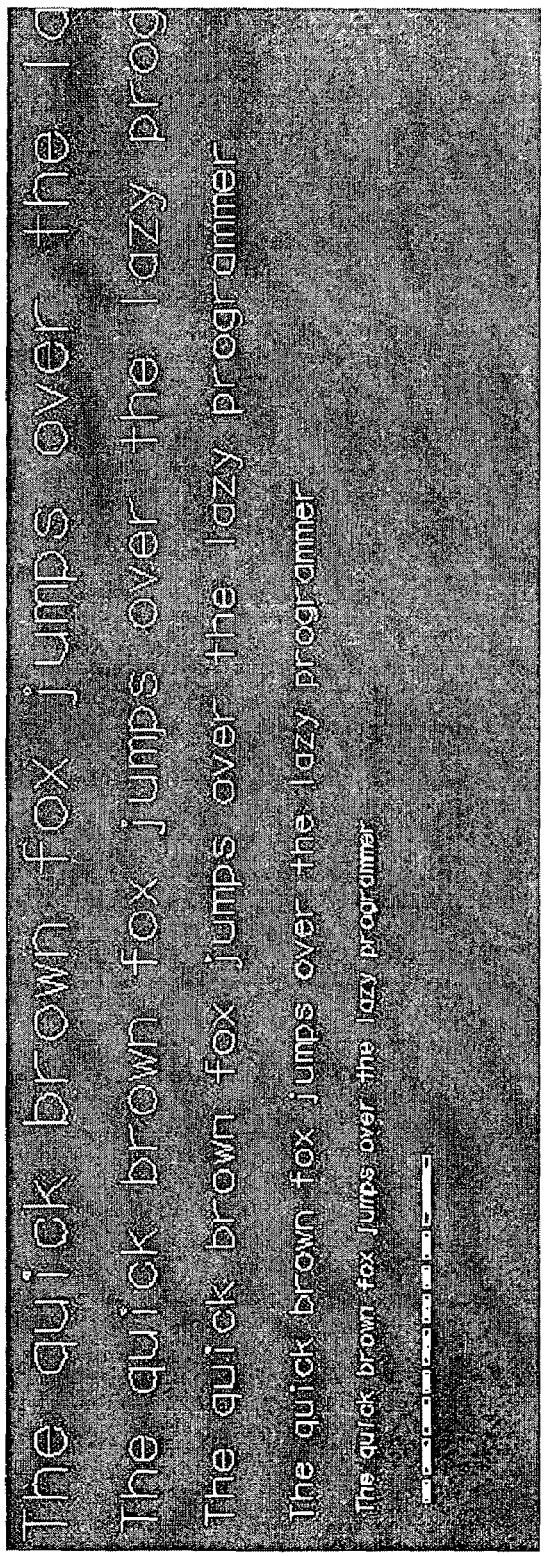
FIG. 1 depicts an embodiment of a text rendering according to conventional rendering techniques.
Figure 2:
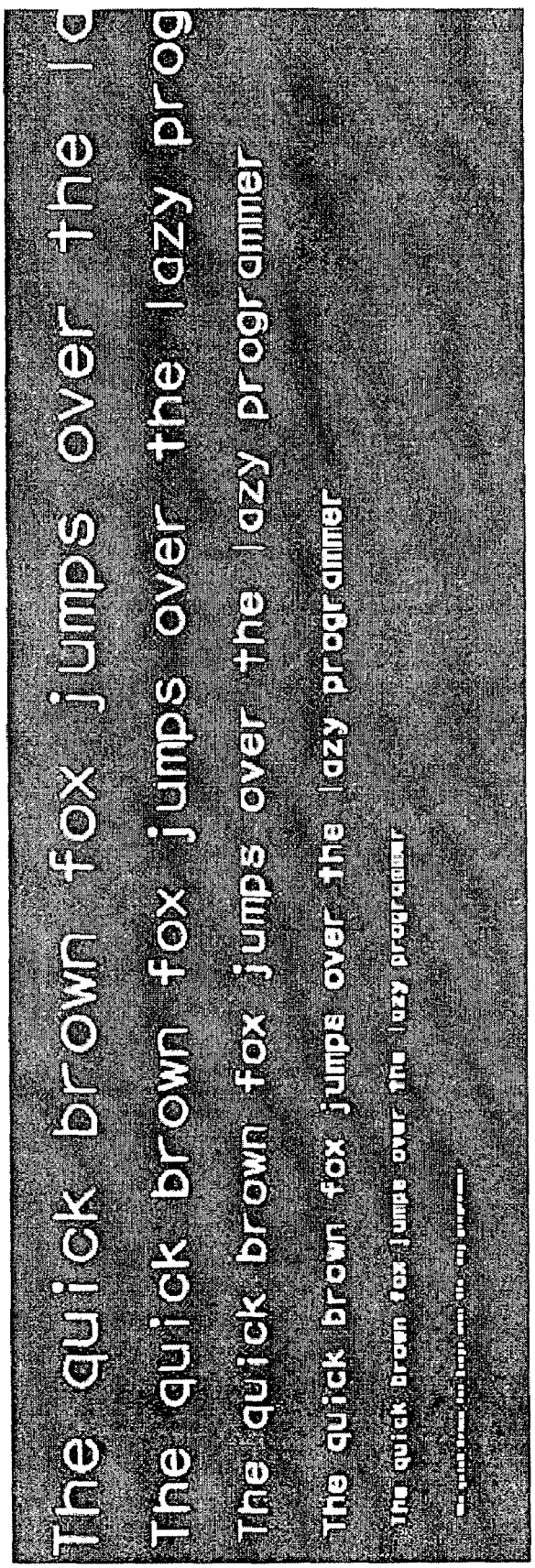
FIG. 2 depicts an exemplary embodiment of a text rendering according to the present invention.

FIG. 2 depicts the text of FIG. 1 rendered according to an exemplary embodiment of the present invention. The glyphs in FIG. 2 are anti-aliased, making them smoother and easier to read against the background. Compared to FIG. 1, the bottom line of smallest resolution text in FIG. 2, while still difficult to read, nevertheless shows the individual glyphs and maintains the shape characteristics of each glyph and renders much more quickly.

An exemplary embodiment of the present invention relies on the use of MIP maps. Vector-based fonts are rendered using a MIP map. However, instead of using the iterative approach to construct MIP maps discussed above, in an exemplary embodiment of the present invention, each level of the MIP map is constructed from the original vector data, rather than interpolating from pixel data from the previous level. Specifically, a non-uniform MIP map is created such that each level of the MIP map has non-uniform changes to the rasterization process applied to the vectors that create each MIP map level.

In an exemplary embodiment of the present invention, the pixel coverage and opacity of each pixel are based on a function of the proximity of the current pixel to the vectors that construct the glyph. Pixel coverage refers to the pixels that will change due to the vector contents of the glyph to be rasterized, i.e. the pixels that make up the glyph display. Pixel opacity is the value of the degree of transparency for a pixel that is "covered." Constructing each MIP map level from original data prevents lines having a width of only a single pixel in the top level image from being filtered away at lower resolutions. In addition, different functions for the pixel coverage and opacity can be used at each level to enhance definition at low resolutions. As a result, the readability of the text increases compared to conventional rendering techniques, because the opacity of the text glyph changes on a level-by-level basis in the MIP map.

Embodiments of the invention may be implemented via a software program operating, for example, in a client-server environment and carrying out the functions described below. The software program may be part of a CAD software program or a separate program.

Figure 3:
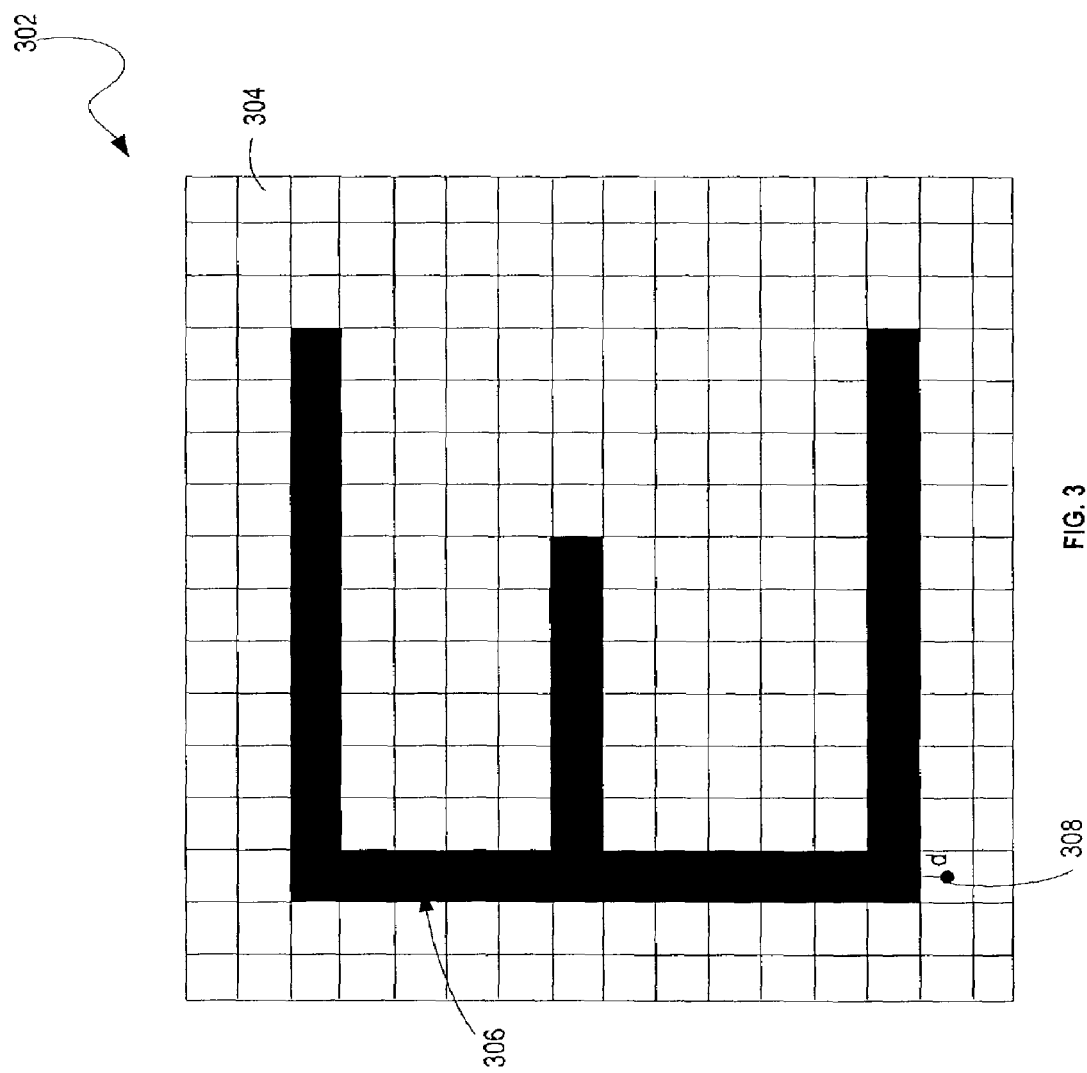
FIG. 3 depicts an exemplary embodiment of the construction of a MIP map level according to the present invention.

FIG. 3 depicts an exemplary embodiment of the construction of a MIP map level according to the present invention. The glyph 302, in this example a capital 'E', is part of a larger image. Each square in FIG. 3, for example, square 304, represents a pixel in the image. The black pixels, such as pixel 306, represent those pixels rasterized by the original glyph vector data. That is, the vector data is used to place the glyph in the image. The opacity of these black pixels is one, meaning the pixels are fully opaque. To construct a MIP map level for this glyph according to the described embodiment of the present invention, a distance d is calculated, for each pixel, from the center 308 of the pixel to the nearest line segment that is part of the glyph. The vector data for the line segments in the glyph are used in the distance calculation. Then that distance d is used to determine the opacity of that pixel.

Figure 4:
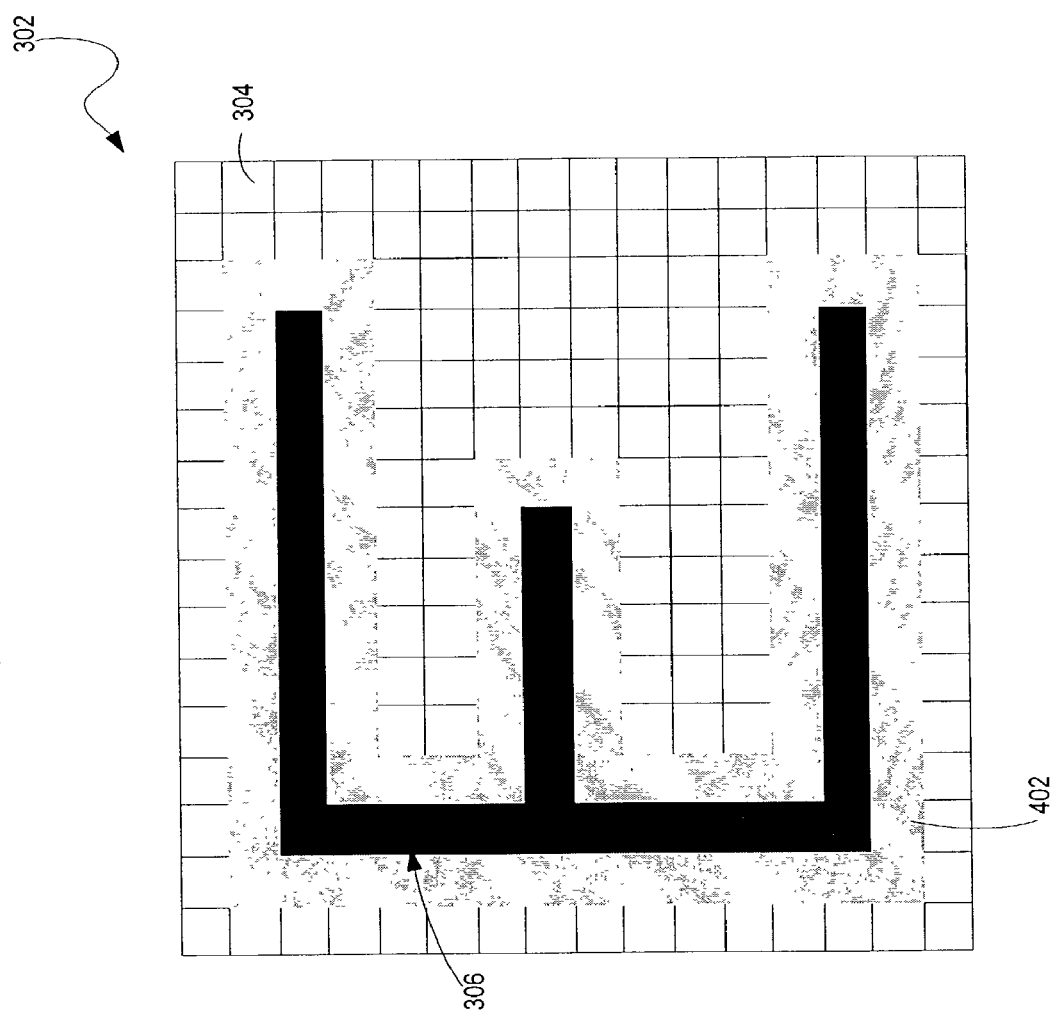
FIG. 4 depicts an exemplary embodiment of a MIP map level according to the present invention.

FIG. 4 shows an exemplary embodiment of a MIP map level in which the opacity of the pixels is based on the distance d shown in FIG. 3. For example, the opacity could be defined as:

$$I = 1.5 - d. \tag{1}$$

Initially, in an exemplary embodiment, each pixel is set to be transparent, i.e. to have zero opacity. Then the original vector font data is rasterized into the MIP map level. Next, for each pixel, the calculated opacity is compared to the current opacity value. If the calculated opacity is larger than the current value, the pixel is assigned a new opacity: the smaller of the calculated opacity and one. The result is that the pixels that the glyph actually "covers" are completely opaque, i.e. their opacity is one. Neighboring pixels are shaded, but less opaque, in proportion to their proximity to the glyph pixels. The gray pixels 402 are those pixels whose opacity is generated by a function of distance from the glyph. The white pixels 304 are fully transparent. The shading provided by the gray pixels 402 creates an anti-aliasing effect around the glyph, making the glyph easier to read on the computer screen.

FIG. 5 depicts an exemplary embodiment of a method according to an exemplary embodiment of the present invention. In rendering vector-based text, a glyph is selected to be rendered during the rendering process in step 502. It is determined whether a MIP map exists for that glyph, for example, by checking a local cache in step 504. If a MIP map exists for that glyph, it is located in step 506. If the MIP map does not exist, a MIP map for that glyph should be generated per step 508. The glyph is then rendered from its MIP map according to methods known in the art in step 510. The rendered glyph can then displayed in step 512.

FIG. 6 depicts an exemplary embodiment of the method 508 of constructing a MIP map according to embodiments of the present invention. From starting at step 602, it is then determined whether all of the needed or required levels in the MIP map have already been created at step 604. If so, the MIP map is finished at step 606 and can be used in step 510 of FIG. 5. Otherwise, the levels should be generated. Vector data for the glyph is retrieved in step 607. The original vector data, rather than data interpolated from another level, should be used. When generating a level of the MIP map, the opacity for all the pixels in the level is set to zero, i.e. transparent, in step 608. Next the original vector font data is rasterized into the MIP map level in step 609. Then, for each pixel, an opacity is calculated in step 610. Different functions may be used to calculate the opacity based on the level. For example, the opacity can be based on the distance of the pixel from the glyph, as in equation (1) described above. Again, the function should be performed based on the original vector data. The calculated opacity for the pixel is compared to the previous opacity value in step 612. Then the calculated opacity is applied to the pixel in step 614 is the calculated value is greater than the previous value. For example, if that pixel's calculated opacity is greater than its previous opacity, the pixel can be assigned either its calculated opacity, or one, which ever is less. If the calculated opacity is not greater than the previous opacity value, no change is made to the pixel's opacity. This process continues at step 616 until all the pixels in the level are checked. When a level is completed, the system either moves to create the next level and repeats the above process, or, if there are no other levels, the MIP map is complete.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of rendering a glyph of a vector-based font comprising the steps of:
    generating a MIP map for a glyph of a vector-based font, wherein said MIP map comprises at least one level having a plurality of pixels and wherein each level is generated from original vector data for said glyph;
    storing said MIP map on a computer readable medium;
    placing said glyph in an image to be rendered;
    retrieving said stored MIP map for said glyph;
    rendering a level of said MIP map, wherein said level is associated with a resolution of said glyph; and
    displaying said glyph as said rendered level.

2. The method of claim 1, wherein said step of generating a level of a MIP map comprises:
    for each pixel in the MIP map level, calculating a distance from said pixel to said glyph; and
    calculating an opacity for said pixel based on a function of said calculated distance.

3. The method of claim 2, wherein at each MIP map level, a different function is used to calculate said pixel opacity.

4. The method of claim 2, further comprising:
    zeroing each pixel's opacity prior to calculating said opacity; and
    assigning to said pixel the lesser of said calculated opacity and one, when said calculated opacity is greater than a previous value of said pixel's opacity.

5. A method of rendering a glyph of a vector-based font comprising the steps of:
    generating a MIP map for a glyph of a vector-based font wherein said MIP map comprises at least one level having a plurality of pixels and wherein a pixel opacity at each level of said MIP map is calculated from a different opacity function;
    storing said MIP map on a computer readable medium;
    placing said glyph in an image to be rendered;
    retrieving said stored MIP map for said glyph;
    rendering a level of said MIP map, wherein said level is associated with a resolution of said glyph; and
    displaying said glyph as said rendered level.

6. The method of claim 5, wherein said glyph's original vector data is used to generate each level of said MIP map.

7. The method of claim 5, wherein said generating step comprises:
    for each pixel in a MIP map level, calculating a distance from said pixel to said glyph; and
    wherein said different opacity function is a function of said calculated distance.

8. The method of claim 5 wherein said generating step comprises:
    zeroing each pixel's opacity prior to calculating said pixel opacity; and
    assigning to said pixel the lesser of said calculated opacity and one, when said calculated opacity is greater than a previous value of said pixel's opacity.

9. A method for generating a MIP map of a glyph of a vector-based font, the MIP map comprising at least one level and a plurality of pixels, the method comprising the steps of:
    for each level of the MIP map, determining a distance from each pixel in said level to said glyph of the vector-based font using the vectors that construct the glyph;
    calculating a pixel coverage and a pixel opacity based on a function of said distance;
    placing said glyph in an image to be rendered;
    retrieving the MIP map for said glyph;
    rendering a level of the MIP map wherein said level is associated with a resolution of said glyph; and
    displaying said glyph as said rendered level.

10. A system for rendering a glyph of a vector-based font comprising:
    means for generating a MIP map for a glyph of a vector-based font, wherein said MIP map comprises at least one level having a plurality of pixels and wherein each level of said MIP map is generated from original vector data for said glyph;
    means for storing said MIP map on a computer readable medium;
    means for placing said glyph in an image to be rendered;
    means for retrieving said stored MIP map for said glyph;
    means for rendering a level of said MIP map, wherein said level is associated with a resolution of said glyph; and
    means for displaying said glyph as said rendered level.

11. The system of claim 10 wherein said means for generating comprises:
    means for calculating a distance from said pixel to said glyph; and means for calculating an opacity for said pixel based on a function of said calculated distance.

12. A computer useable information storage medium storing computer readable program code for causing a computer to perform the steps of:
   generating a MIP map for a glyph of a vector-based font, wherein said MIP map comprises at least one level having a plurality of pixels and wherein each level of said MIP map is generated from original vector data for said glyph;
   storing said MIP map on a computer readable medium;
   retrieving said stored MIP map for said glyph;
   rendering a level of said MIP map, wherein said level is associated with a resolution of said glyph; and
   displaying said glyph as said rendered level.

13. The computer useable information storage medium storing computer readable program code of claim 12, wherein said generating step comprises:
   for each pixel in the MIP map level, calculating a distance from said pixel to said glyph; and
   calculating an opacity for said pixel based on a function of said calculated distance.

* * * * *